United States Patent
Yeh

(10) Patent No.: US 11,452,389 B2
(45) Date of Patent: Sep. 27, 2022

(54) HOOK FOR ADJUSTING VERSATILE WIDTHS

(71) Applicant: Tso Hua Yeh, New Taipei (TW)

(72) Inventor: Tso Hua Yeh, New Taipei (TW)

(*) Notice: Subject to any disclaimer, the term of this patent is extended or adjusted under 35 U.S.C. 154(b) by 0 days.

(21) Appl. No.: 17/330,410

(22) Filed: May 26, 2021

(65) Prior Publication Data

US 2021/0369018 A1 Dec. 2, 2021

(30) Foreign Application Priority Data

May 26, 2020 (TW) .................................. 109117464

(51) Int. Cl.
*F16M 13/00* (2006.01)
*A47G 1/16* (2006.01)
*F16M 13/02* (2006.01)

(52) U.S. Cl.
CPC ............. *A47G 1/164* (2013.01); *F16M 13/02* (2013.01)

(58) Field of Classification Search
CPC .... F16M 13/02; A47G 1/164; A47G 25/0607; A47G 1/202; A47G 1/20; A47G 1/17; A47G 2200/106
See application file for complete search history.

(56) References Cited

U.S. PATENT DOCUMENTS

| 1,510,978 | A | * | 10/1924 | Conklin | F16B 5/10 |
| | | | | | 384/396 |
| 7,992,833 | B1 | * | 8/2011 | Goodman | A47G 25/0614 |
| | | | | | 248/339 |
| 9,307,700 | B1 | * | 4/2016 | Schmitt | E04H 13/001 |
| 10,302,247 | B2 | * | 5/2019 | Forrest | F16B 45/00 |
| 2011/0049325 | A1 | * | 3/2011 | Johnson | A47G 1/164 |
| | | | | | 248/495 |
| 2013/0240697 | A1 | * | 9/2013 | Rutigliano | A47G 7/044 |
| | | | | | 248/227.1 |
| 2014/0138505 | A1 | * | 5/2014 | Maclaren-Taylor | A47K 10/12 |
| | | | | | 248/231.61 |

FOREIGN PATENT DOCUMENTS

| CN | 202287680 U | 7/2012 |
| GB | 2221156 A | 1/1990 |
| TW | 210646 | 8/1993 |
| TW | 290080 | 11/1996 |

* cited by examiner

*Primary Examiner* — Amy J. Sterling

(57) ABSTRACT

A hook for adjusting versatile widths has a body and a gasket. The body has a base and a hook body. The hook body is disposed on the base. The gasket has a hole and a plurality of protruding structures. The protruding structures are disposed around the hole. The different thicknesses of the protruding structures correspond to the different peripheral positions of the hole. The hook body penetrates through the hole of the gasket, and the gasket is able to rotate on the hook body.

3 Claims, 4 Drawing Sheets

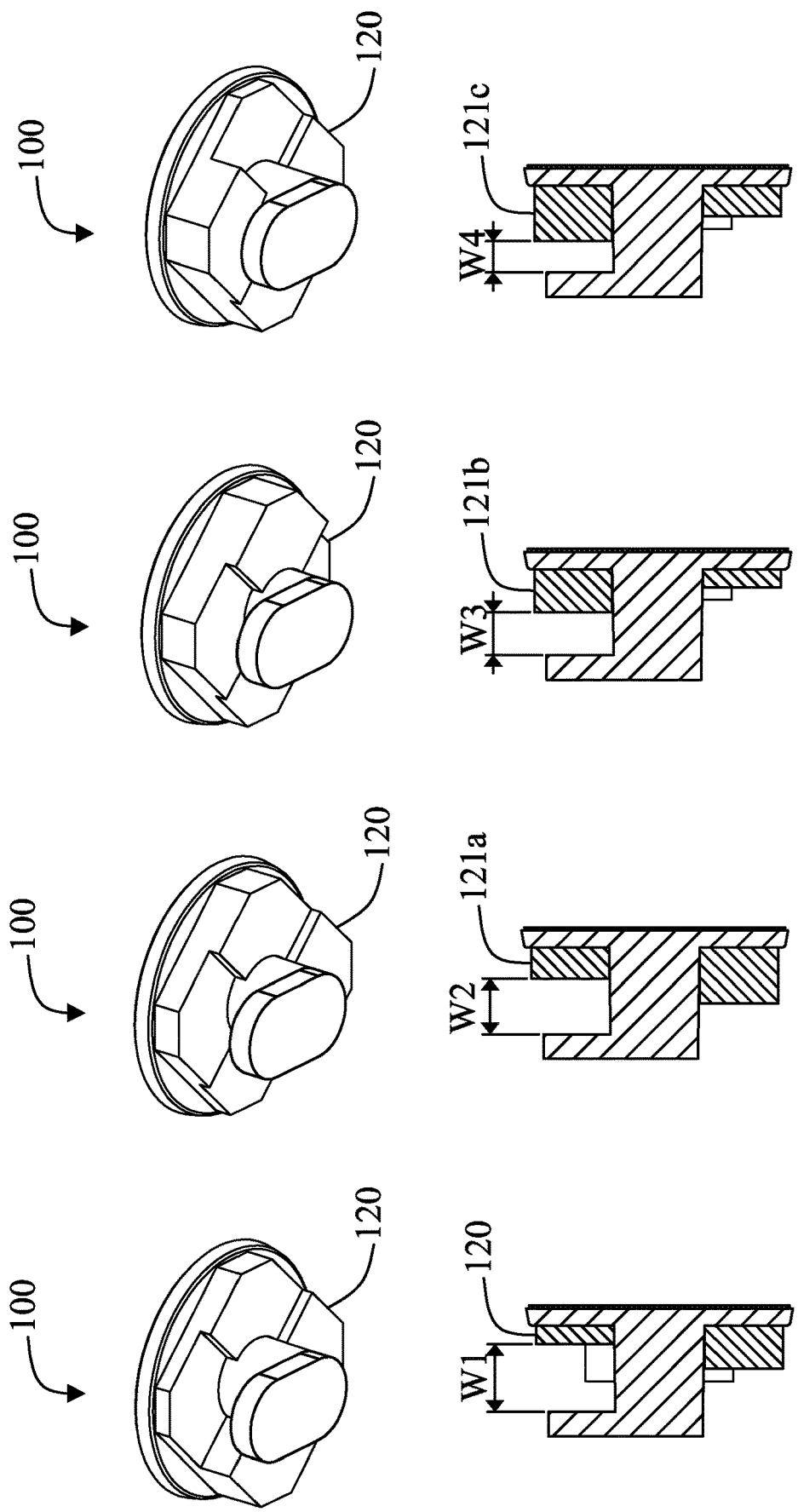

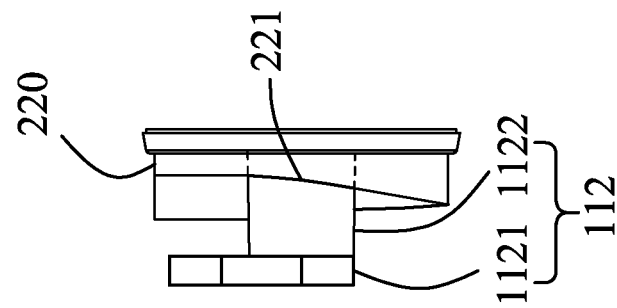
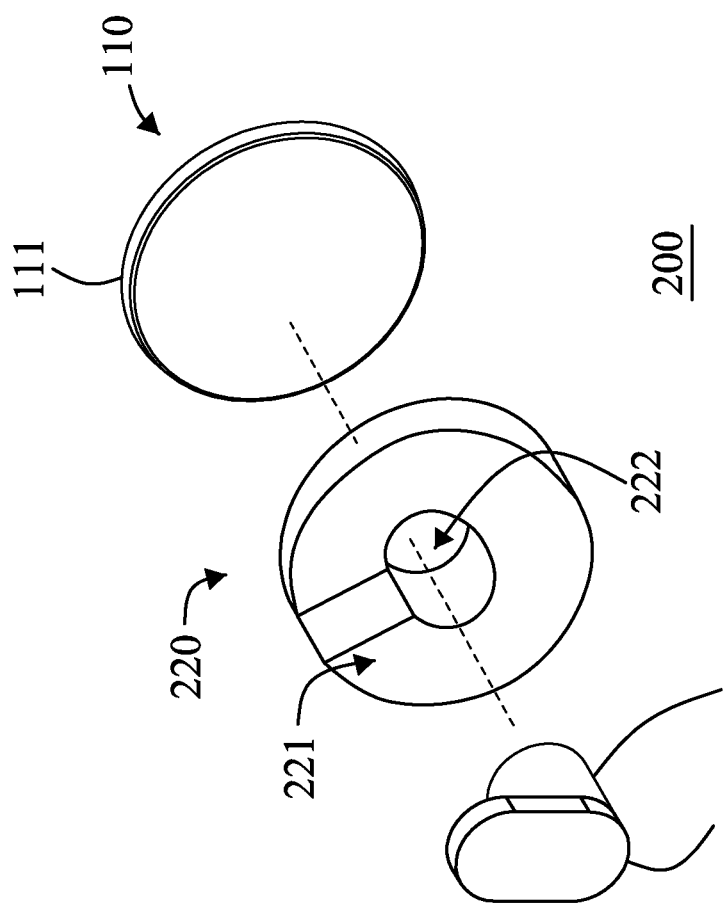
Fig. 4B
Fig. 4A

HOOK FOR ADJUSTING VERSATILE WIDTHS

BACKGROUND OF THE INVENTION

1. Field of the Invention

The present invention relates to a hook, more particularly a hook for adjusting versatile widths.

2. Description of the Prior Art

Hook is one of the commonly used household goods, it can be fixed to wall in various ways. The various goods also can be placed at the hook such as hangers, bags, bags, etc. Some users will use a hook to place the device such as phone or tablet PC, and then these devices can be fixed to the well.

However, the thickness of a phone and the thickness of a tablet PC are different because of different type or case. The devices having different thickness need the hooks with different widths. In fact, the width of the commercially available hook is single size. In case of multiple thicknesses, the single sized hook is definitely not suitable to.

Therefore how to solve aforesaid problem is an important issue to persons having ordinary skills in the art.

SUMMARY OF THE INVENTION

To achieve the foregoing and other objects, a hook for adjusting versatile widths is provided, and it has more space to for different dimensions of objects.

A hook for adjusting versatile widths is provided in the present invention and has a body and a gasket. The body has a base and a hook body that is disposed on a plane of the base. The gasket has a hole and a plurality of protruding structures. The hole is disposed on the center of the gasket, and the protruding structures are disposed around the hole. The different thicknesses of the protruding structures correspond to the different peripheral positions of the hole. The hook body penetrates through the hole of the gasket, and the gasket is able to rotate on the hook body.

More, the hook body further has a hook part and a cylinder part, the first end of the cylinder part has the hook part, the second end of the cylinder part connects with the plane of the base. The first end of the hook part passes through the hole of the gasket.

A hook for adjusting versatile widths is provided in the present invention and has a body and a gasket. The body has a base and a hook body that is disposed on a plane of the base. The gasket has a hole and a continuous slope structure. The continuous slope structure is disposed around the hole, so as to make that different thicknesses of the continuous slope structure corresponds to the different peripheral positions of the hole. The hook body penetrates through the hole of the gasket, and the gasket is able to rotate on the hook body.

The foregoing, as well as additional objects, features and advantages of the invention will be more readily apparent from the following detailed description, which proceeds with reference to the accompanying drawings.

BRIEF DESCRIPTION OF THE DRAWINGS

FIG. 3A to FIG. 3D illustrate schematic views of different widths of the hook for adjusting versatile widths of the present invention; and FIG. 4A and FIG. 4B illustrate schematic views of another hook for adjusting versatile widths of the present invention.

DESCRIPTION OF THE PREFERRED EMBODIMENTS

Figure 1B:
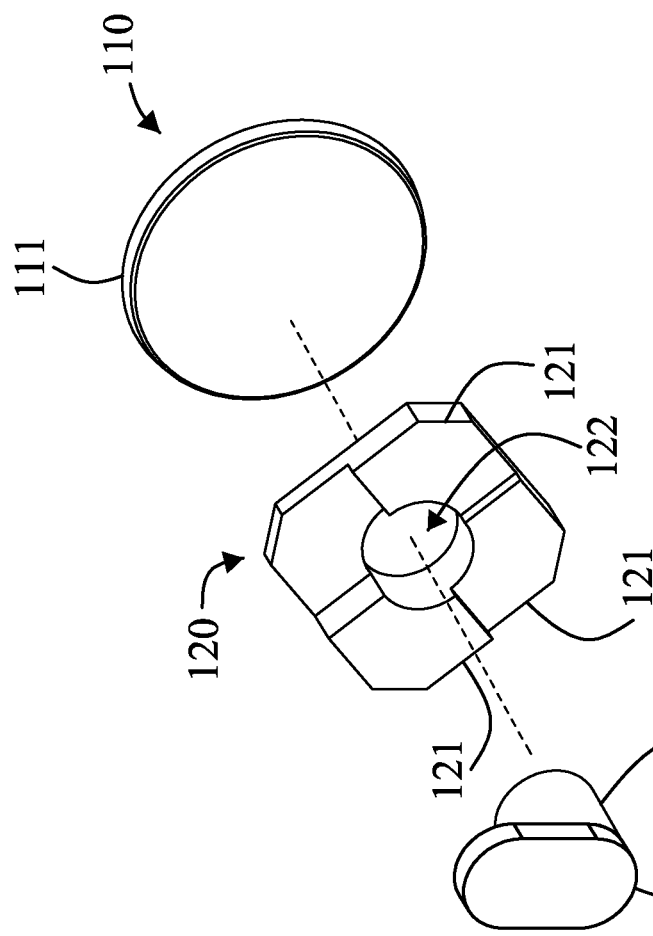
FIG. 1B illustrates a schematic exploded view of the hook for adjusting versatile widths of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

A hook for adjusting versatile widths is provided in the present invention. The width of the hook is adjustable by way of rotating of a gasket able to have multiple thicknesses to adapt different devices.

Figure 1A:
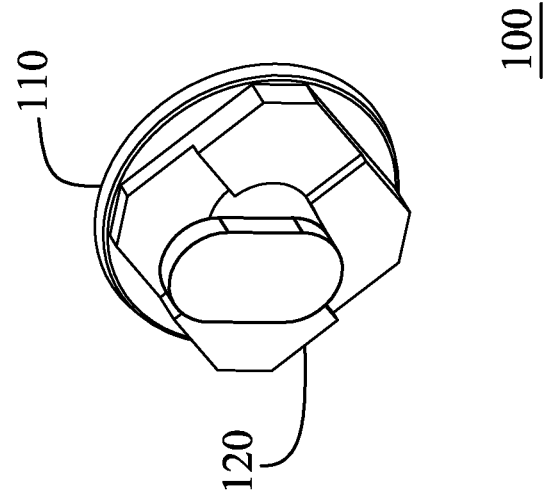
FIG. 1A illustrates a schematic view of a hook for adjusting versatile widths of the present invention.

Please refer to FIG. 1A and FIG. 1B. The Fig, which illustrate a schematic view of a hook for adjusting versatile widths of the present invention and a schematic exploded view of the hook for adjusting versatile widths of the present invention. The hook for adjusting versatile widths 100 includes a body 110 and a gasket 120. The body 110 is the main body of the hook, and includes a base 111 and a hook body 112. The hook body 112 is disposed on the base 111. In this embodiment, the base 111 is a disc-shaped base, and can be adhered on the wall via suction cups, glue or screws. Other application is through magnetic elements. The hook body 112 is disposed on the plane of the base 111 and includes a hook part 1121 and a cylinder part 1122. The cylinder part 1122 is disposed on the base 111, and the hook part 1121 is disposed on the cylinder part 1122. The thickness of the hook part 1121 is greater than the thickness of the cylinder part 1122 to form the hook body 112. Furthermore, the first end of the cylinder part 1122 has the hook part 1121, and the second end of the cylinder part 1122 connects with the plane of the base 111. The first end of the hook part 1121 passes through the hole 122 of the gasket 120.

The gasket 120 includes a plurality of protruding structures 121 and a hole 122. The hole 122 is disposed on the center of the gasket 120 and passed through the gasket 120. The protruding structures 121 are disposed around the hole 122, and the different thicknesses of the protruding structure 121 correspond to different peripheral positions of the hole 122. That is, the thicknesses of each protruding structure 121 is changed according to the disposing position around the hole 122. For the embodiment, the protruding structures 121 are three. The gasket 120 is sleeved on the hook body 112 via the hole 122 of gasket 120, and the gasket 120 is able to rotate on the hook body 112. In addition, the size of the hole 122 is similar to the cylinder part 1122. Thus, there is a friction between the gasket 120 and the hook part 122 but the gasket 120 still can be rotated on the hook body 112. As the embodiment, the shape of the gasket 120 is a quadrilateral with chamfered corners, but it is not limited thereto and can be polygon or circle.

Figure 2B:
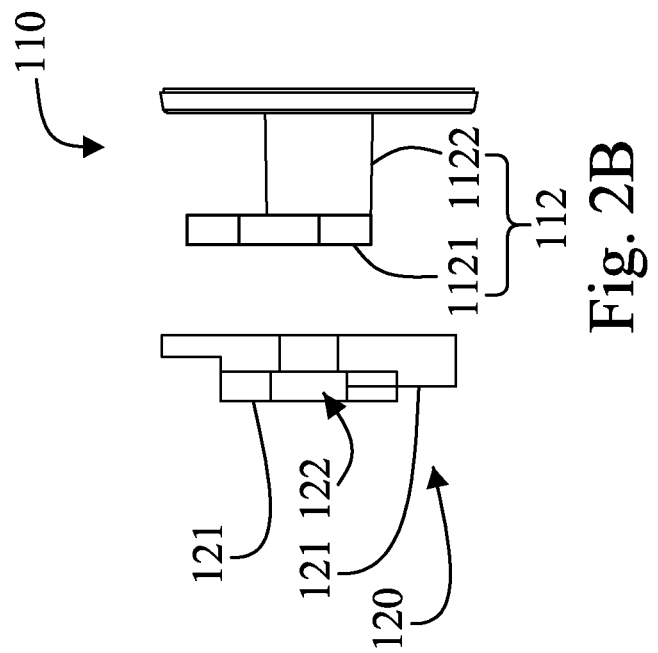
FIG. 2B illustrates a lateral exploded view of the hook for adjusting versatile widths of the present invention.
Figure 2A:
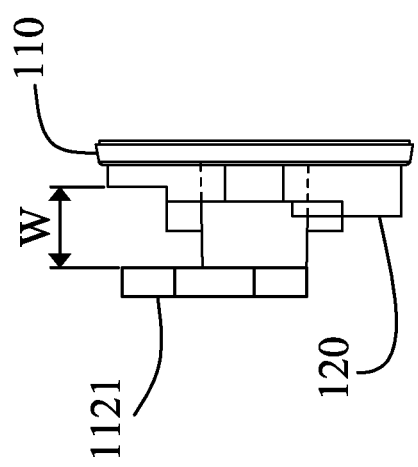
FIG. 2A illustrates a lateral assembly view of the hook for adjusting versatile widths of the present invention.

Please refer to FIG. 2A and FIG. 2B, which illustrate a side lateral assembly diagram view of the hook for adjusting versatile widths of the present invention and a lateral exploded view of the hook for adjusting versatile widths of the present invention. As shown in FIG. 2B, the protruding structures 121 of the gasket 120 makes the gasket 120 has different thicknesses at different position. Further to FIG. 2A, a width W is formed between the thicknesses of the gasket 120 and the hook part 1121 of the hook body 112. The width W represents the space of the hook, and the space is configured to hold/load an object. The gasket 120 can be rotated to align the protruding structures 121 with the hook part 1121 and change the width W because the gasket 120 has different thicknesses. Therefore, the hook for adjusting versatile widths is applied for the objects with multiple thicknesses.

Please refer FIG. 3A to FIG. 3D, which illustrate schematic views of different widths of the hook for adjusting versatile widths of the present invention, and include lateral views and top views. As shown in FIG. 3A, the width W1 is formed by the basic thickness of the gasket 120, and has a wider thickness. FIG. 3B shows that the width W2 is formed by the protruding structure 121a after the gasket 120 is rotated. FIG. 3C represents that the width W3 is formed by the protruding structure 121b after the gasket 120 is rotated again. For FIG. 3D, the width W4 is formed by the protruding structure 121c after the gasket 120 is rotated for the third time. It can be seen that the width W1 to the width W4 are gradually reduced in order to position the objects with different thickness. As the embodiment, the widths of W1, W2, W3, and W4 are 11 mm, 9 mm, 7 mm, and 5 mm respectively.

With reference to FIG. 4A and the FIG. 4B, which illustrate schematic views of another hook for adjusting versatile widths of the present invention, and include an exploded view and a lateral assembly view. The body 110 is similar to aforesaid embodiment so it will not be described any further. The difference is that the gasket 220 includes a continuous slope structure 221 and a hole 222. The hole 222 is on the center of the gasket 220. The continuous slope structure 221 is disposed around the hole 222 so as to make that the different thicknesses of the continuous slope structure 221 corresponds to the different peripheral positions of the hole 222. For the embodiment, the gasket 220 is round but it is not limited thereto, and can be polygon, etc.

The gasket 220 is sleeved on the hook body 112 via the hole 222. There is a friction between the gasket 220 and the cylinder part 1122, but the gasket 220 still can be rotated on the cylinder part 1122. A space can be formed by the thickness of the gasket 220 and the hook part 1121, and the space of the hook for adjusting versatile widths 200 is configured to hold/load multiple objects. The gasket 110 has the continuous slope structure 221, so that the gasket 110 has multiple thicknesses. The gasket 220 can be rotated to align part having different thicknesses with the hook body 112 and form a space having different width.

The gasket 220 can be rotated to align the protruding structures 221 with the hook part 1121 and change the width W because the gasket 120 has different thicknesses. Therefore, the hook 200 for adjusting versatile widths can be applied to the objects with multiple thicknesses.

The hook 100/200 for adjusting versatile widths of the present invention has a gasket 120/220 with multiple thicknesses. The different thicknesses of the gasket 120/220 and the hook body 112 forms a space with different widths via rotating the gasket 120/220. As a conclusion, through an easy way, the hook with simple structure is able to hold/load more objects with different thicknesses.

While the preferred embodiment of the invention has been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

I claim:

1. A hook for adjusting versatile widths comprising:
   a body (110), comprising:
      a base (111); and
      a hook body (112), disposed on a plane of the base (111); and
   a gasket (120), comprising:
      a hole (122), disposed on a center of the gasket (120); and
      a plurality of protruding structures (121), disposed around the hole (122), different thicknesses of the protruding structures (121) corresponding to different peripheral positions of the hole (122);
   wherein the hook body (112) penetrates through the hole (122) of the gasket (120), and the gasket (120) is able to rotate on the hook body (112).

2. The hook for adjusting the versatile widths of claim 1, wherein the hook body (112) further comprises a hook part (1121) and a cylinder part (1122), a first end of the cylinder part (1122) having the hook part (1121), a second end of the cylinder part (1122) connecting with the plane of the base (111), the first end of the hook part (1121) passing through the hole (122) of the gasket (120).

3. A hook for adjusting versatile widths comprising:
   a body (110), comprising:
      a base (111); and
      a hook body (112), disposed on a plane of the base (111); and
   a gasket (220), comprising:
      a hole (222), disposed on a center of the gasket (220); and
      a continuous slope structure (221), disposed around the hole (222), so as to make that different thicknesses of the continuous slope structure (221) corresponds to different peripheral positions of the hole (222);
   wherein the hook body (112) penetrates through the hole (222) of the gasket (220), and the gasket (120) is able to rotate on the hook body (112).

* * * * *